(12) United States Patent
Ke et al.

(10) Patent No.: US 11,477,834 B2
(45) Date of Patent: Oct. 18, 2022

(54) METHOD AND DEVICE FOR WLAN AGGREGATION CONTROL

(71) Applicant: Samsung Electronics Co., Ltd., Gyeonggi-do (KR)

(72) Inventors: Xiaowan Ke, Beijing (CN); Hong Wang, Beijing (CN); Lixiang Xu, Beijing (CN)

(73) Assignee: Samsung Electronics Co., Ltd ( * ) Notice: Subject to any disclaimer, the term of this patent is extended or adjusted under 35 U.S.C. 154(b) by 0 days.

(21) Appl. No.: 15/752,070

(22) PCT Filed: Aug. 10, 2016

(86) PCT No.: PCT/KR2016/008804
§ 371 (c)(1),
(2) Date: Feb. 12, 2018

(87) PCT Pub. No.: WO2017/026801
PCT Pub. Date: Feb. 16, 2017

(65) Prior Publication Data
US 2018/0242386 A1 Aug. 23, 2018

(30) Foreign Application Priority Data

Aug. 10, 2015 (CN) .......................... 201510488038.2

(51) Int. Cl.
H04W 76/16 (2018.01)
H04W 76/18 (2018.01)
(Continued)

(52) U.S. Cl.
CPC ............. H04W 76/16 (2018.02); H04W 8/24 (2013.01); H04W 24/10 (2013.01);
(Continued)

(58) Field of Classification Search
None
See application file for complete search history.

(56) References Cited

U.S. PATENT DOCUMENTS

2010/0188991 A1  7/2010 Raleigh
2013/0242897 A1  9/2013 Meylan et al.
(Continued)

FOREIGN PATENT DOCUMENTS

CN     102026246     4/2011
CN     103220786     7/2013
(Continued)

OTHER PUBLICATIONS

PCT/ISA/210 Search Report issued on PCT/KR2016/008804 (pp. 3).
(Continued)

Primary Examiner — Yemane Mesfin
Assistant Examiner — Jeff Banthrongsack
(74) Attorney, Agent, or Firm — The Farrell Law Firm, P.C.

(57) ABSTRACT

The present invention provides a method for WLAN aggregation control, comprising: receiving, by a base station, WLAN information of a UE, said WLAN information of the UE comprises one or more of the following: user preference information, WLAN information of a WLAN node with which the UE is being associated, WLAN information of a WLAN node reselected by the UE, de-association information of the UE with a WLAN node, WLAN enabling information of the UE, and WLAN disabling information of the UE; and determining, by the base station, whether WLAN aggregation is to be established or deleted for the UE according to the received WLAN information of the UE. With the present application, WLAN aggregation can be reasonably controlled. Also, the present invention provides
(Continued)

a method by a terminal, comprising: identifying a connection status with a node in a second network, setting status information associated with the node based on the connection status, and transmitting, to a base station in a first network, a report message including the status information.

8 Claims, 13 Drawing Sheets

(51) Int. Cl.
  *H04W 24/10* (2009.01)
  *H04W 60/00* (2009.01)
  *H04W 84/12* (2009.01)
  *H04W 8/24* (2009.01)
  *H04W 60/06* (2009.01)

(52) U.S. Cl.
  CPC ......... *H04W 60/005* (2013.01); *H04W 60/06* (2013.01); *H04W 76/18* (2018.02); *H04W 84/12* (2013.01)

(56) References Cited

U.S. PATENT DOCUMENTS

| | | | |
|---|---|---|---|
| 2014/0362692 A1 | 12/2014 | Wu et al. | |
| 2015/0264738 A1 | 9/2015 | Lee et al. | |
| 2015/0341840 A1 | 11/2015 | Lee et al. | |
| 2016/0014680 A1 | 1/2016 | Jang et al. | |
| 2017/0367035 A1* | 12/2017 | Koskela | H04W 48/16 |

FOREIGN PATENT DOCUMENTS

| | | |
|---|---|---|
| CN | 103297172 | 9/2013 |
| CN | 104170308 | 11/2014 |
| EP | 2919505 A1 * | 9/2015 ........ H04W 36/0072 |
| WO | WO 2013/063812 | 5/2013 |
| WO | WO 2014/069959 | 5/2014 |
| WO | WO 2014/133359 | 9/2014 |
| WO | WO 2014/137169 | 9/2014 |
| WO | WO-2014137169 A1 * | 9/2014 ............ H04W 36/14 |

OTHER PUBLICATIONS

PCT/ISA/237 Written Opinion issued on PCT/KR2016/008804 (pp. 6).
3GPP TR 37.834 V12.0.0 (Dec. 2013) 3rd Generation Partnership Project; Technical Specification Group Radio Access Network; Study on Wireless Local Area Network (WLAN) . . . .
3GPP radio interworking (Release 12), Copyright 2013 3GPP Organizational Partners (ARIB, ATIS, CCSA, ETSI, TTA, TTC), pp. 20.
3GPP TSG-RAN WG2 Meeting #90, Fukuoka, Japan, May 25-29, 2015, Qualcomm Incorporated, KT Corp., China Telecom, WLAN Selection and Mobility, pp. 8.
Qualcomm Incorporated et al., "Control Plane Architecture for LTE-WLAN Aggregation", R2-152738, 3GPP TSG-RAN WG2 Meeting #90, May 25-29, 2015, 5 pages.
Samsung, "Considerations of User Preference on LTE-WLAN Interworking/Aggregation", R2-152339, 3GPP TSG-RAN WG2 Meeting #89bis, May 25-29, 2015, 5 pages.
MediaTek Inc., "Traffic Steering Procedure and Command for NCIWK", R2-152139, 3GPP TSG-RAN2 #90 Meeting, May 25-29, 2015, 3 pages.
European Search Report dated Oct. 26, 2018 issued in counterpart application No. 16835441.3-1214, 13 pages.
Chinese Office Action dated Feb. 2, 2021 issued in counterpart application No. 201510488038.2, 17 pages.
Chinese Office Action dated Nov. 17, 2021 issued in counterpart application No. 201510488038.2, 8 pages.

* cited by examiner

METHOD AND DEVICE FOR WLAN AGGREGATION CONTROL

PRIORITY

This application is a National Phase Entry of PCT International Application No. PCT/KR2016/008804 which was filed on Aug. 10, 2016, and claims priority to Chinese Patent Application No. 201510488038.2, which was filed on Aug. 10, 2015, the content of each of which is incorporated herein by reference.

TECHNICAL FIELD

The present invention relates to the wireless communication technology and in particular to a method and device for WLAN aggregation control.

BACKGROUND ART

The modern mobile communications increasingly provide multi-media services of high-rate transmission to users. FIG. 1 is a system architecture diagram of system architecture evolution (SAE), in which:

user equipment (UE) 101 is a terminal device supporting a network protocol; evolved-universal terrestrial ratio access network (E-UTRAN) 102 is a wireless access network, including a base station (eNodeB/NodeB) which provides an interface for a UE for accessing to a wireless network; mobility management entity (MME) 103 is responsible for managing the mobility context, session context and security information of a UE; serving gateway (SGW) 104 mainly plays a role of providing a user panel, and the MME 103 and the SGW 104 may in a same physical entity; packet data gateway (PGW) 105 is responsible for charging, legal interception or the like, and may be in the same physical entity as the SGW 104; policy and charging rule functional entity (PCRF) 106 provides a quality of service (QoS) policy and charging rule; serving GPRS support node (SGSN) 108 is a network node device which provides routing for transmission of data in a universal mobile communication system (UMTS); home subscriber server (HSS) 109 is a home ownership subsystem of a UE, and responsible for protecting user information such as current location of a UE, address of a serving node, user security information, packet data context of a UE.

DISCLOSURE OF INVENTION

Technical Problem

In an existing network, no mechanism which selects a WLAN node for a UE to offload data of the UE under the control of a base station has been defined.

Solution to Problem

The present invention provides a method for WLAN aggregation control, by which WLAN aggregation can be reasonably controlled.

To achieve this purpose, the present application provides the following technical solutions.

A method for wireless local area network (WLAN) aggregation control, including:

a: receiving, by a base station, ELAN information of a user equipment (UE), said WLAN information of the UE comprises one or more of the following: user preference information, WLAN information of a WLAN node with which the UE is being associated, WLAN information of a WLAN node reselected by the UE, de-association information of the UE with a WLAN node, WLAN enabling information of the UE, and WLAN disabling information of the UE; and b: determining, by the base station, whether WLAN aggregation is to be established or deleted for the UE according to the received WLAN information of the UE.

Preferably, said user preference information is used for indicating whether the WLAN information of the UE provided currently is selected by a user via the UE; and/or said WLAN enabling information of the UE is used for indicating that a user has selected to turn on the WLAN function; and/or said WLAN disabling information of the UE is used for indicating that a user has selected to turn off the WLAN function; and/or said WLAN information of a WLAN node reselected by the UE includes one or more of the following: WLAN information of a WLAN node after the reselection of the UE and WLAN information of a WLAN node before the reselection of the UE; and/or said de-association information of the UE with a WLAN node includes a WLAN ID of a WLAN node to be de-associated and a de-association indicator.

Preferably, with regard to said WLAN information of a WLAN node with which a UE is being associated and/or said WLAN information of a WLAN node reselected by a UE, the WLAN information includes one or more of the following: a WLAN ID, a PLMN ID, a received signal strength indicator (RSSI) of a beacon broadcasted, basic service set load (BSS Load)/channel utilization, backhaul uplink/downlink available bandwidth, UE average access delay, the number of UEs accessed, UE average throughput rate, and WLAN overall load percentage.

Preferably, a WLAN ID contains one or more of the following: a service set ID (SSID), a basic service set ID (BSSID), and a homogenous extension service set ID (HESSID).

Preferably, when a user associates a WLAN node via said UE or when a user reselects and associates a WLAN node via said UE, said WLAN information of the UE received by said base station includes information about a WLAN node with which the UE is being associated; and/or when a user reselects and associates a WLAN node via said UE, said WLAN information of the UE received by said base station includes WLAN information of a WLAN node reselected by the UE; and/or when a user de-associates a currently associated WLAN node via said UE and/or does not re-associate a new WLAN node, said WLAN information of the UE received by said base station includes de-association information of the UE with a WLAN node; and/or when WLAN information of a WLAN node with which said UE is currently associated no longer satisfies a configured WLAN aggregation threshold condition or it is measured that there is no target WLAN node candidate whose WLAN information satisfies said WLAN aggregation threshold condition, said WLAN information of the UE received by said base station includes de-association information of the UE with a WLAN node.

Preferably, said target WLAN node candidate is a WLAN node at least satisfying one of the following conditions:

a target WLAN node candidate is a WLAN node in a public land mobile network (PLMN) registered by the UE or an equivalent PLMN;

a target WLAN node candidate is a WLAN node within a management range of a wireless terminator (WT) allowed to be connected by a base station; and a target WLAN node candidate is a WLAN node to which the UE is allowed to initiate association/re-association.

Preferably, if said WLAN information of the UE includes WLAN information of a WLAN node with which the UE is being associated, then when a base station establishes WLAN aggregation for said UE:

if a WLAN node with which said UE is being associated satisfies at least one of the following set conditions, the base station preferentially selects a WLAN node to which the UE is being associated and its home WT to establish WLAN aggregation; and/or if a WLAN node with which said UE is being associated does not satisfy at least one of the following set conditions, the base station does not establish WLAN aggregation for said UE; said set conditions include the following:

a WLAN node with which said UE is currently associated has a home WT and said base station has established an Xw interface with its home WT;

a WLAN node with which said UE is currently associated is a WLAN node in a PLMN currently registered by the UE and/or an equivalent PLMN;

a WLAN node with which said UE is currently associated and its measurement information satisfy a configured WLAN aggregation threshold condition; and a WLAN node with which said UE is currently associated and its measurement information do not satisfy said WLAN aggregation threshold condition, but said UE measures that there is another WLAN node which at least satisfies one of the following conditions: said another WLAN node is a WLAN node in a PLMN registered by the UE or an equivalent PLMN; said another WLAN node is a WLAN node within the management range of a home WT of a WLAN node with which the UE is currently associated; said another WLAN node is a WLAN node allowed to be re-associated by said UE from the currently associated node; and WLAN information of said another WLAN node satisfies said WLAN aggregation threshold condition.

Preferably, when a base station has established WLAN aggregation before receiving said WLAN information of the UE, if said base station determines, according to said received WLAN information of the UE, that the reselection of said UE to access to one WLAN node satisfies one or more of the following conditions, said base station sends an indication to said UE and to a WT in its established WLAN aggregation, said indication being used for indicating to delete the established WLAN aggregation of the UE, and stops sending data in a UE user panel to said WT:

said reselected WLAN node is not a WLAN node in WLAN aggregation indicated to the UE by a base station;

said reselected WLAN node is not a WLAN node within the management range of a WT in said established WLAN aggregation;

said reselected WLAN node is not a WLAN node in a PLMN currently registered by the UE and/or an equivalent PLMN;

said reselected WLAN node is not a WLAN node allowed to be associated/re-associated by said established WLAN aggregation; and the WLAN information of said reselected WLAN node does not satisfy a configured WLAN aggregation threshold condition.

Preferably, the way for said base station to determine that said UE reselects to access to one WLAN node is as follows:

a WLAN node, indicated by WLAN information of a WLAN node with which the UE is being associated included in the said WLAN information of the UE, is not a WLAN node with which said UE is previously associated; or said WLAN information of the UE includes WLAN information of a WLAN node reselected by said UE, and according to this information, it is determined that said UE reselects to access to one WLAN node.

Preferably, when said WLAN information of the UE includes said de-association information of the UE with a WLAN node or said WLAN disabling information of the UE, said base station indicates the UE and a WT to delete the current aggregation of the UE, and stops sending data in the UE user panel to said WT.

Preferably, when said WLAN information of the UE includes user preference information, a base station determines, according to this preference information, whether the currently sent WLAN information is selected by a user via the UE; or only when WLAN information of the UE is selected by a user via the UE, said UE, or another base station or a core network sends corresponding WLAN information of the UE to the base station.

Preferably, said WLAN information of the UE is sent by the UE or another base station or a core network.

Preferably, said WLAN information of a WLAN node satisfying a WLAN aggregation threshold condition means that WLAN information of a WLAN node at least satisfies to one of the following conditions:

the channel utilization/BSS load of a WLAN node is less than a configured channel utilization/BSS load threshold;

the backhaul uplink/downlink available bandwidth of a WLAN node is greater than a configured backhaul uplink/downlink available bandwidth threshold;

the RSSI of a beacon of a WLAN node is greater than a configured RSSI threshold of the beacon;

the UE average access delay of a WLAN node is smaller than a configured UE average access delay threshold;

the number of users of a WLAN node is less than a configured threshold of the number of users;

the user average throughput rate of a WLAN node is less than a configured user average throughput rate threshold;

the WLAN overall available capacity of a WLAN node is greater than a configured WLAN overall available capacity threshold.

A method for WLAN aggregation control is provided, including:

receiving, by a base station, information sent by a WLAN terminator (WT), indicating to delete WLAN aggregation or de-associate a UE from a WLAN node; and deleting, by the base station, according to said information indicating to delete WLAN aggregation or de-associate the UE with the WLAN node, WLAN aggregation specified by said information.

Preferably, when a WT determines that a UE is de-associated with and/or is not re-associated with a WLAN node satisfying at least one of the following conditions, said WT sends to said base station said information indicating to delete WLAN aggregation or de-associate the UE with the WLAN node:

a WLAN node is a WLAN node in a PLMN registered by the UE or an equivalent PLMN;

a WLAN node is a WLAN node within a management range of a home WT of a node with which the UE is currently associated; and a WLAN node is a WLAN node allowed by the current WLAN aggregation to be associated/re-associated by the UE.

A method for WLAN aggregation control is provided, including:

receiving, by a UE, WLAN aggregation configuration sent by a base station for indicating requirements to be satisfied by a WLAN aggregation node, said WLAN aggregation configuration including one or more of the following: a PLMN ID, a WLAN aggregation node ID list, a WLAN aggregation threshold condition, and association/re-association decision time; and determining, by the UE, whether WLAN aggregation is to be established satisfying said WLAN aggregation configuration according to user selection.

Preferably, before said UE determines whether said WLAN aggregation is to be established, when said UE has been associated with one WLAN node according to user selection, if the associated WLAN node satisfies at least one of the following conditions, said UE preferentially selects said associated WLAN node to establish WLAN aggregation; or otherwise, said UE determines said WLAN aggregation is not to be established:

a WLAN aggregation node ID list contains a WLAN ID of said associated WLAN node;

said associated WLAN node and its WLAN measurement information satisfy a configured WLAN aggregation threshold condition; and said associated WLAN node does not satisfy said WLAN aggregation threshold condition but said UE measures that there is another WLAN node which at least satisfies one of the following conditions: the WLAN aggregation node ID list contains a node ID of the WLAN node; and the WLAN node satisfies a WLAN aggregation threshold condition.

Preferably, before said UE determines whether said WLAN aggregation is to be established, if the WLAN function of said UE has been turned off by user selection, said UE determines said WLAN aggregation is not to be established.

A method for WLAN aggregation control is provided, including:

receiving, by a UE, user selection; and determining, by said UE, according to the user selection, whether to request a base station to delete an established WLAN aggregation.

Preferably, said user selection indicates that the UE reselects to access to a new WLAN node;

when said new WLAN node satisfies at least one of the following conditions, said UE determines to request the base station to delete said WLAN aggregation:

a WLAN aggregation node ID list received by said UE does not contain a WLAN ID of said new WLAN node;

said new WLAN node is not a WLAN node in a PLMN currently registered by the UE and/or an equivalent PLMN;

said new WLAN node is not a WLAN node allowed by the current WLAN aggregation to be associated/re-associated; and said new WLAN node does not satisfy a configured WLAN aggregation threshold condition.

Preferably, when said user selection is to de-associate with the WLAN node of said WLAN aggregation or turn off WLAN function of said UE, said UE determines to request the base station to delete the established WLAN aggregation.

A base station device for WLAN aggregation control is provided, including: a receiving unit and a control unit;

said receiving unit is configured to receive WLAN information of a user equipment (UE), said WLAN information of a UE includes one or more of the following: user preference information, WLAN information of a WLAN node with which a UE is being associated, WLAN information of a WLAN node reselected by a UE, de-association information of the UE with a WLAN node, WLAN enabling information of the UE, and WLAN disabling information of the UE; and said control unit is configured to determine whether WLAN aggregation is to be established, modified or deleted for the UE according to the received WLAN information of the UE.

A base station device for WLAN aggregation control is provided, including: a receiving unit and a control unit;

said receiving unit is configured to receive information indicating to delete WLAN aggregation or receives de-association information of the UE with a WLAN node from a WT; and said control unit is configured to delete, according to said information indicating to delete WLAN aggregation or de-associate the UE with the WLAN node, the WLAN aggregation specified by said information.

A user equipment for WLAN aggregation control is provided, including: a receiving unit and a control unit;

said receiving unit is configured to receive WLAN aggregation configuration sent by a base station for indicating requirements to be satisfied by a WLAN aggregation node, said WLAN aggregation configuration including one or more of the following: a PLMN ID, a WLAN aggregation node ID list, a WLAN aggregation threshold condition, and association/re-association decision time; and said control unit is configured to determine whether WLAN aggregation is to be to established satisfying said WLAN aggregation configuration according to user selection.

A user equipment for WLAN aggregation control is provided, including: a receiving unit and a control unit;

said receiving unit is configured to receive user selection; and said control unit is configured to determine, according to the user selection, whether to request a base station to delete an established WLAN aggregation.

In accordance with an aspect of the present disclosure a method by a terminal is provided. The method includes identifying a connection status with a node in a second network, setting status information associated with the node based on the connection status, and transmitting, to a base station in a first network, a report message including the status information.

In accordance with an aspect of the present disclosure a method by a base station is provided. The method includes receiving report message including status information associated with a node in the second network, from a terminal, identifying a connection status between the terminal and the node based on the status information, and determining whether to establish a connection with the node based on an identification result.

In accordance with an aspect of the present disclosure a terminal is provided. The terminal includes a transceiver for transmitting and receiving a signal, and a controller configured to identify a connection status with a node in a second network, set status information associated with the node based on the connection status, and transmit, to a base station in a first network, a report message including the status information.

In accordance with an aspect of the present disclosure a base station is provided. The base station includes a transceiver for transmitting and receiving a signal; and a controller configured to receive report message including status information associated with a node in the second network, from a terminal, identify a connection status between the terminal and the node based on the status information, and determine whether to establish a connection with the node based on an identification result.

It can be seen from the above technical solutions that, a base station can acquire WLAN information of a UE and establish or delete WLAN aggregation according to the corresponding WLAN information.

Advantageous Effects of Invention

In this way, WLAN aggregation can be reasonably controlled according to the WLAN information of a UE.

MODE FOR THE INVENTION

In order to increase the throughput of a UE, in an existing network architecture, a method for WLAN aggregation is provided. WLAN aggregation is by establishing, for a UE, dual connection of an EUTRAN bearer and a WLAN bearer, to offload part of or all data sent to the UE to WLAN. The control panel of the UE is still established between the UE and the base station, and the WLAN offloads only data in the user panel. The base station controls the establishment and deletion of aggregation on the WLAN side. By means of WLAN aggregation, on one hand, the bandwidth of the WLAN is utilized to serve the UE, and on the other hand, the problem of poor service continuity of the WLAN is solved.

Association of a UE with a WLAN node means that a connection between the UE and the WLAN node is established so that they can exchange data. Re-association of a UE with a WLAN node means that the association of the UE with one WLAN node is transferred to another WLAN node or the UE is switched to access to another WLAN node. After a UE is re-associated with another WLAN node, the continuity is still kept. WLAN nodes which can support re-association generally belong to a same extended service set (ESS), a same HESS or a same management range.

Figure 1:
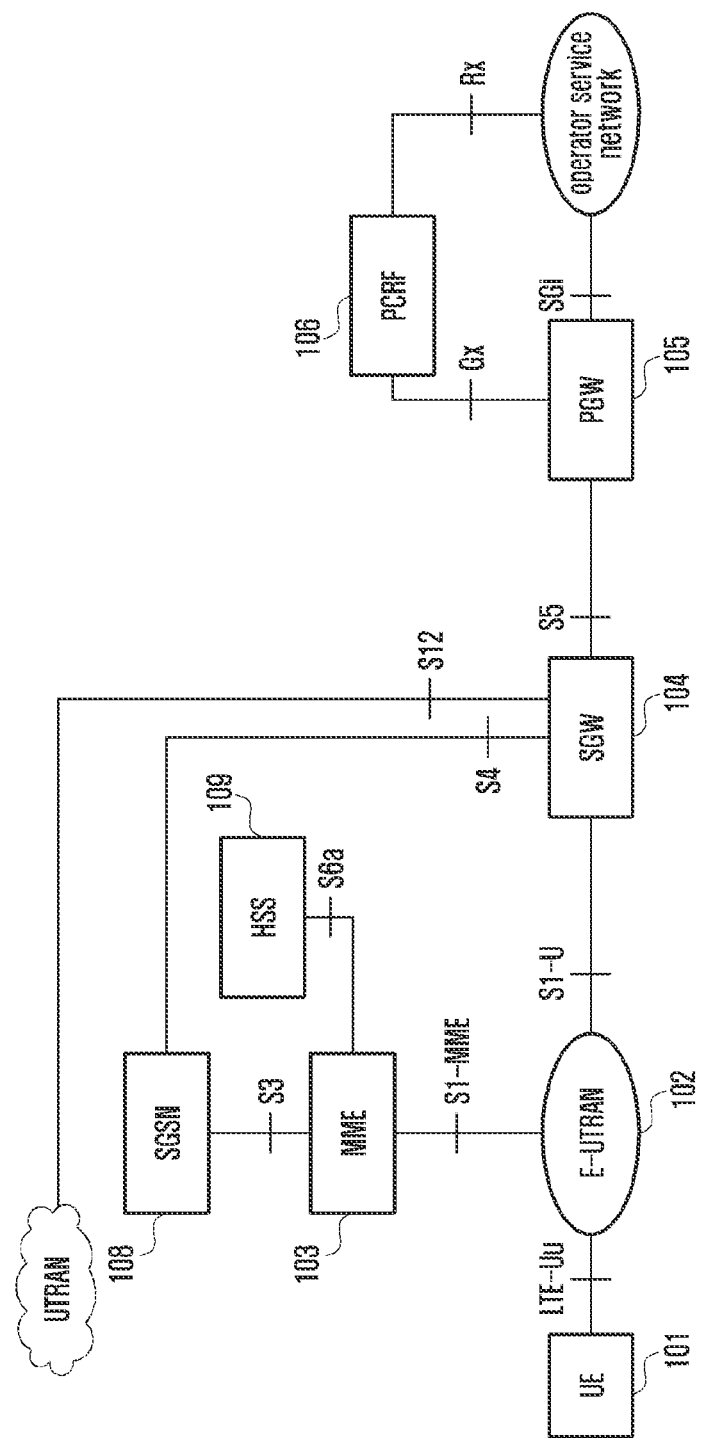
FIG. 1 is a schematic architecture diagram of an EPS according to the present invention.
Figure 2:
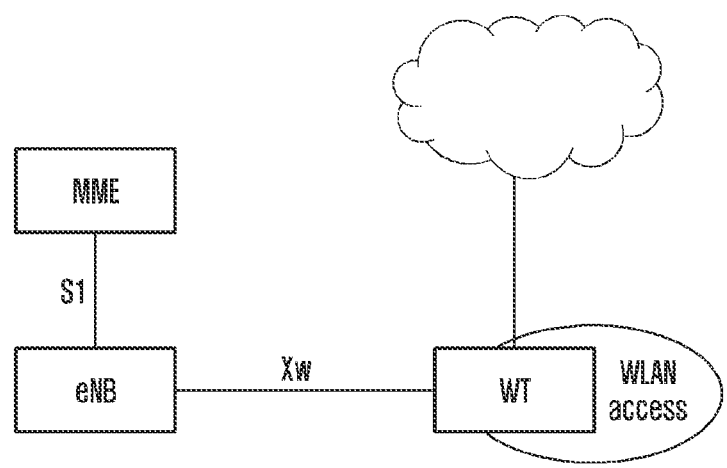
FIG. 2 is a schematic view of an interface between a base station and a WLAN according to the present invention.

As shown in FIG. 2, an interface between a base station and the WLAN side is an Xw interface, and an opposite terminal of the Xw interface of the base station is a WLAN terminator (WT). The WT can be regarded as a proxy of the WLAN side, and by the WT, the influence on the WLAN side can be shielded. The WT can manage one to a plurality of WLAN entities (AP, AC, BSS, ESS, HESS or other entities). The WT can be a separate node or integrated with an AP, an AC or other entities of a WLAN node.

At present, WLAN aggregation also has the following problems.

Problem 1): The user preference should be respected, and the UE should not be restricted to detect and select a certain WLAN node.

For example, assumed that a user has selected and allowed a UE to associate and access to one WLAN node (for example, an AP), if a base station indicates the UE to reselect an AP, the UE may be de-associated with the previous AP, and as a result, data transmission between the UE and the previous AP may be interrupted. During the WLAN aggregation, a user may manually select another AP. This may lead to de-association between the AP for the WLAN aggregation and the UE, and as a result, data transmission between the UE and the AP for the WLAN aggregation may be interrupted. At present, the selection of an AP is executed by a UE. The selection and reselection of an AP by a user via a UE is transparent to a base station.

Problem 2): It is unable to determine whether WLAN aggregation is to be established or deleted for the UE according to the user preference.

Scenario 1: Before WLAN aggregation, a user has been associated with one AP.

Scenario 2: A user is associated with another AP after WLAN aggregation of the UE or is de-associated with a WLAN node for WLAN aggregation.

Scenario 3: A user turns off the WLAN function after WLAN aggregation of the UE.

The above three scenarios are also transparent to a base station, and the base station is unable to correctly establish and delete WLAN aggregation of a UE.

To make the objectives, technical solutions and advantages of the present invention clearer, the present invention will be further described in detail as below with reference to the accompanying drawings by embodiments.

Figure 3:
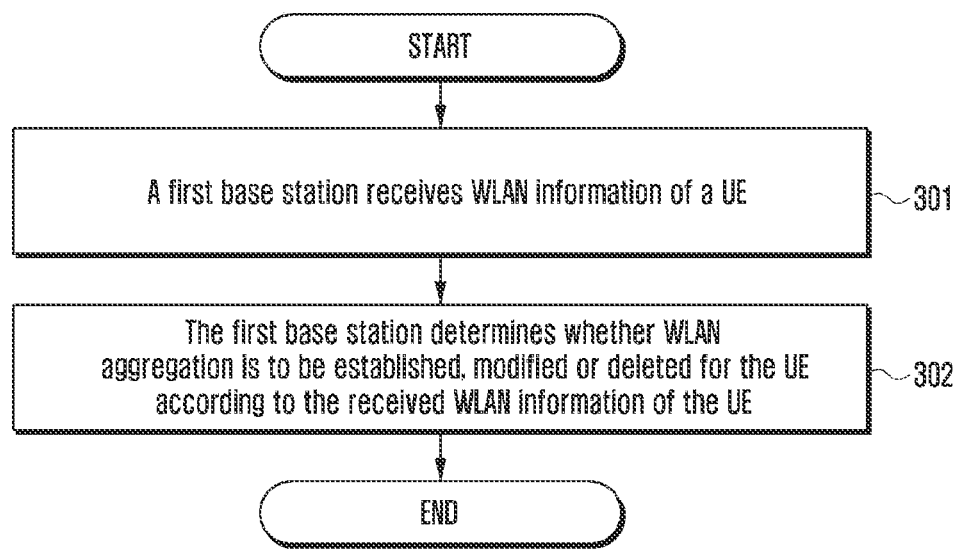
FIG. 3 is a schematic flowchart of a first method for WLAN aggregation control according to the present invention.

FIG. 3 is a schematic flowchart of a first method for WLAN aggregation control according to the present invention. This method includes the following steps.

S301: A first base station receives WLAN information of a UE.

The WLAN information of the UE can be sent by the UE, a WT, a core network or another base station.

Optionally, the WLAN information of the UE includes one or more of the following: user preference information, WLAN information of a WLAN node with which the UE is being associated, WLAN information of a WLAN node reselected by the UE, de-association information of the UE with a WLAN node, WLAN enabling information of the UE, and WLAN disabling information of the UE.

Optionally, the user preference information is used for indicating whether the WLAN information of the UE provided currently is user preference, i.e., is selected by a user via the UE.

Optionally, the WLAN information of a WLAN node with which the UE is being associated can include one or more of the following: a WLAN ID, a PLMN ID, RSSI of a beacon broadcasted, BSS Load/channel utilization, backhaul uplink/downlink available bandwidth, UE average access delay, the number of UEs accessed, UE average throughput rate, and WLAN overall load percentage.

In some implementations, the first base station acquires WLAN information of a WLAN node by means of the UE measurement on the WLAN node, for example, WLAN information of a WLAN node with which the UE is being associated is acquired by means of the UE measurement, or WLAN information of a target WLAN node candidate is acquired by the UE measurement. In further implementations, the first base station can acquire, from a WT, WLAN information of a WLAN node managed by the WT, for example, WLAN information of a WLAN node in a PLMN within the management range of different WTs, or WLAN information of a WLAN node with which the UE is being associated/re-associated within the management range of a WT. In further implementations, a base station acquires information about a WLAN node by means of the coordination of a UE's measurement and a WT. For example, according to a WLAN ID of a WLAN node reported after the UE measurement, a first base station can know, by associating the WLAN information acquired by the WT, whether the WLAN node reported by the UE is a WLAN node in a PLMN registered by the UE or an equivalent PLMN, the management range of which WT the WLAN node reported by the UE belongs to, and whether the WLAN node reported by the UE is allowed to be associated/re-associated with by the UE, or more.

In some implementations, when a user enable a UE to associate with a certain WLAN node or to reselect and associate with a certain WLAN node, the UE can send, to the first base station, information about the WLAN node with which the UE is being associated.

Optionally, the WLAN ID at least contains one of the following: SSID, BSSID, and HESSID.

Optionally, the WLAN information of a WLAN node reselected by the UE can include one or more of the following: WLAN information of a WLAN node after the reselection of the UE and WLAN information of a WLAN node before the reselection of the UE. With regard to the WLAN information of a WLAN node reselected by the UE, the WLAN information is the same as the above-mentioned WLAN information of a WLAN node with which the UE is being associated, and will not be repeated here. In some implementations, when a user enable a UE to reselect and to be associated with a certain WLAN node, the UE can send, to the first base station, WLAN information of a WLAN node reselected by the UE.

Optionally, the WLAN enabling information of the UE can include a WLAN function being turned on indicator. In some implementations, when a user turns on the WLAN function via a UE, the UE can send WLAN enabling information of the UE to the first base station.

Optionally, the WLAN disabling information of the UE can include a WLAN function being turned off indicator. In some implementations, when a user turns off the WLAN function via a UE, the UE can send WLAN disabling information of the UE to the first base station.

Optionally, the de-association information of the UE with a WLAN node includes at least one of the following: a WLAN ID of a WLAN node to be de-associated and a de-association indicator. In some implementations, when a user enable a UE to de-associate a currently associated WLAN node and/or does not re-associate with a new WLAN node, the UE can send, to the first base station, de-association information of the UE with a WLAN node. In some implementations, when WLAN information of a WLAN node with which the UE is currently associated no longer satisfies a configured WLAN aggregation threshold condition or there is no target WLAN node candidate whose WLAN information can satisfy the WLAN aggregation threshold condition, the UE can send, to the first base station, de-association information of the UE with a WLAN node.

Optionally, the target WLAN node candidate at least satisfies one of the following:

a WLAN node in a PLMN registered by the UE or an equivalent PLMN;

a WLAN node within the management range of a WT allowed to be connected by a base station; and a WLAN node to which the UE can be allowed to initiate association/re-association.

Optionally, WLAN information of a WLAN node failing to satisfy the WLAN aggregation threshold condition means that the WLAN information of the WLAN node at least satisfies one of the following conditions:

the channel utilization/BSS load is greater than a configured channel utilization/BSS load threshold;

the backhaul uplink/downlink available bandwidth is less than a configured backhaul uplink/downlink available bandwidth threshold;

the RSSI of a beacon is less than a configured RSSI threshold of the beacon;

the UE average access delay is greater than a configured UE average access delay threshold;

the number of users is greater than a configured threshold of the number of users;

the user average throughput rate is greater than a configured user average throughput rate threshold; and the WLAN overall available capacity is less than a configured WLAN overall available capacity threshold.

Optionally, WLAN information of a WLAN node satisfying the WLAN aggregation threshold condition means that the WLAN information of the WLAN node at least satisfies one of the following conditions:

the channel utilization/BSS load is less than a configured channel utilization/BSS load threshold;

the backhaul uplink/downlink available bandwidth is greater than a configured backhaul uplink/downlink available bandwidth threshold;

the RSSI of a beacon is greater than a configured RSSI threshold of the beacon;

the UE average access delay is less than a configured UE average access delay threshold;

the number of users is less than a configured threshold of the number of users;

the user average throughput rate is less than a configured user average throughput rate threshold; and the WLAN overall available capacity is greater than a configured WLAN overall available capacity threshold.

In some implementations, when WLAN information of a WLAN node at least equals to one of the above thresholds, it can be considered that the WLAN node satisfies the WLAN aggregation threshold condition.

In some implementations, the threshold value used for determining whether WLAN information of a source WLAN node satisfies WLAN aggregation threshold condition can be different from the threshold value used for determining whether WLAN information of a target WLAN node satisfies WLAN aggregation threshold condition.

Optionally, the first base station can receive WLAN information of a WLAN node of a UE from a measurement report or an RRC message. The first base station can further acquire WLAN information of a WLAN node of a UE from a WT during the Xw establishment or WLAN aggregation establishment.

S302: The first base station determines whether WLAN aggregation is to be established, modified or deleted for the UE according to the received WLAN information of the UE.

Optionally, the first base station knows a WLAN node to which a UE is being associated; when the first base station determines to establish WLAN aggregation for the UE, if the WLAN node to which the UE has been associated satisfies one of the following conditions for establishing WLAN aggregation, the first base station can preferentially select this associated WLAN node and a WT to which this WLAN node belongs to establish WLAN aggregation. Conditions for establishing WLAN aggregation include:

a WLAN node with which the UE is currently associated has a home WT and the first base station has established an Xw interface with its home WT or has established an Xw interface;

a WLAN node with which the UE is currently associated is a WLAN node in a PLMN currently registered by the UE and/or an equivalent PLMN;

WLAN information of a WLAN node with which the UE is currently associated satisfies the WLAN aggregation threshold condition; and whether WLAN information satisfies the WLAN aggregation threshold condition is as described in S301, and will not be repeated here; and WLAN information of a WLAN node with which the UE is currently associated does not satisfy the WLAN aggregation threshold condition, but the UE measures that there is another WLAN node whose WLAN information at least satisfies one of the following conditions:

a WLAN node in a PLMN registered by the UE or an equivalent PLMN;

a WLAN node within the management range of a home WT of a node with which the UE is currently associated;

a WLAN node with which the UE can be re-associated, from a node with which the UE is currently associated; and a WLAN node satisfying the WLAN aggregation threshold condition.

In some implementations, when conditions for establishing WLAN aggregation are satisfied, the base station can establish WLAN aggregation for the UE, and indicate WLAN aggregation configuration information to the UE.

Optionally, the base station can indicate, in the WLAN aggregation configuration information, a WLAN node with which the UE is currently associated, or indicate a WLAN aggregation node ID list or a WLAN aggregation threshold condition, so that the UE reselects, from the WLAN aggregation node ID list, one WLAN node whose WLAN information satisfying the WLAN aggregation threshold condition, for association/re-association. The WLAN aggregation threshold condition is as described in S301, and will not be repeated here.

A WLAN node in the WLAN aggregation node ID list being a target WLAN node candidate at least contains one of the following conditions:

a WLAN node in a PLMN registered by the UE or an equivalent PLMN;

a WLAN node within the management range of a home WT of a node with which the UE is currently associated; and a WLAN node with which the UE can be re-associated, from a WLAN node with which the UE is currently associated.

In some implementations, if this associated WLAN node on longer satisfies the conditions for establishing WLAN aggregation, the first base station may not establish WLAN aggregation for the UE.

Optionally, when the UE performs WLAN aggregation, and the first base station knows that the UE reselects to access to a new WLAN node and/or a WLAN node newly selected by the UE at least satisfies one of the following WLAN de-aggregation conditions, the first base station can delete the current WLAN aggregation of the UE to the WT and stop sending data in the UE user panel to the WT; meanwhile, the first base station can delete the current WLAN aggregation of the UE to the UE or reselect a new WT to serve for the WLAN aggregation of the UE:

not a WLAN node in WLAN aggregation indicated to the UE by the base station;

not a WLAN node within the management range of a WT in the currently established WLAN aggregation;

not a WLAN node in a PLMN currently registered by the UE and/or an equivalent PLMN;

not a WLAN node allowed to be associated/re-associated for the current UE's WLAN aggregation; and a WLAN node whose WLAN information does not satisfy the WLAN aggregation threshold condition. Whether the WLAN information does not satisfy the WLAN aggregation threshold condition is as described in S301, and will not be repeated here.

In some implementations, the first base station can know that the UE reselects a new WLAN node in the following two ways. First, WLAN information of a WLAN node with which the UE is being associated is received, which indicates that this WLAN node is not the WLAN node previously associated with; and second, WLAN information of a WLAN node reselected by the UE is received. The WLAN information of a WLAN node reselected by the UE is as described in S301, and will not be repeated here.

In some implementations, when the UE is performing WLAN aggregation, if the first base station receives de-association information of the UE with a WLAN node or WLAN disabling information of the UE, the first base station can delete the current WLAN aggregation of the UE to the UE and the WT and stop sending data in the UE user panel to the WT.

In some implementations, when the UE is performing WLAN aggregation, if the first base station receives de-association information of the UE with a WLAN node, the first base station can consider to re-indicate, to the UE, the WLAN aggregation of the UE on the previous WLAN node or reselect a WLAN node for WLAN aggregation.

In some implementations, there can be two ways for the base station to know whether the WLAN information of the UE provided is user preference. First, the WLAN information of the UE includes user preference information, this information indicating whether the WLAN information is user preference; and second, only when the WLAN information is user preference, the UE can send the WLAN information of the UE or the base station can receive the WLAN information of the UE, and now, the base station can know that the received WLAN information of the UE is user preference. In some implementations, only when the received WLAN information of the UE is user preference, the base station can perform the above operations, otherwise, during the establishment of WLAN aggregation for the UE, the WLAN node with which the UE is currently associated may not be taken into consideration. For example, if the selected WLAN node for WLAN aggregation is not necessarily the WLAN node with which the UE is currently associated, it is indicated that the UE turns on the WLAN function which has been turned off by the UE before.

Figure 4:
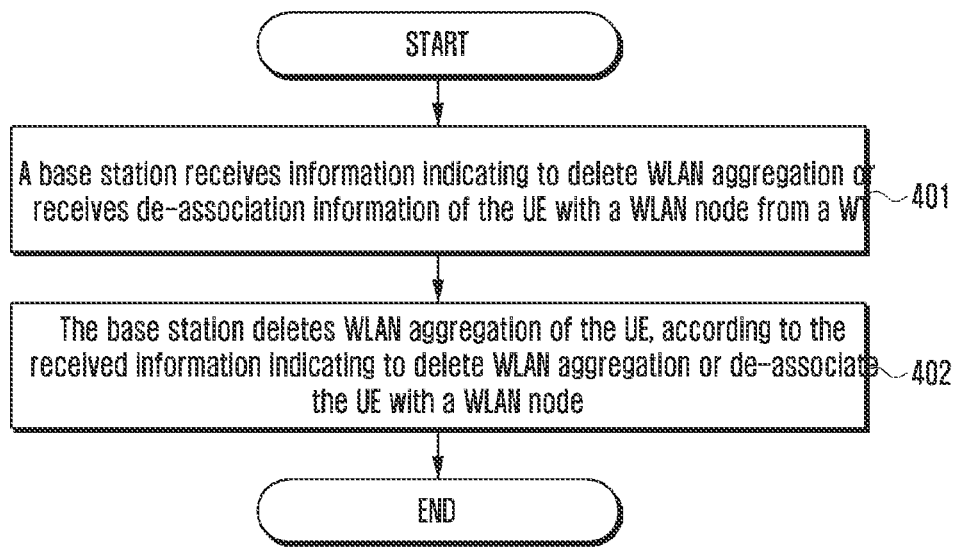
FIG. 4 is a schematic flowchart of a second method for WLAN aggregation control according to the present invention.

FIG. 4 is a schematic flowchart of a second method for WLAN aggregation control according to the present invention. This method describes how a base station acquires WLAN information, including the following steps.

S401: A base station receives information indicating to delete WLAN aggregation or receives de-association information of the UE with a WLAN node from a WT.

The de-association information of a UE with a WLAN node is as described in S301, and will not be repeated here.

In some implementations, when a WT realizes that the UE is de-associated with or is not re-associated with a WLAN node satisfying one of the following conditions, the WT can send de-association information of the UE with a WLAN node to a base station or delete WLAN aggregation. The deletion reason can be the de-association of the UE with a WLAN node:

a WLAN node in a PLMN registered by the UE or an equivalent PLMN;

a WLAN node within the management range of a home WT of a node with which a UE is currently associated;

a WLAN node allowed by the current WLAN aggregation to be associated/re-associated by the UE; and a WLAN node which can be allowed for WLAN aggregation by the UE, indicated by the base station or the WT.

In some implementations, the de-association of the UE from a WLAN node in the WT is caused by a user. For example, a user reselects a new WLAN node via a UE, and thus de-associates the current WLAN node and turns off the WLAN function, or more.

S402: The base station deletes WLAN aggregation of the UE, according to the received information indicating to delete WLAN aggregation or de-associate the UE with a WLAN node.

The method for establishing and deleting WLAN aggregation by a base station according to WLAN information is described above. Next, the specific implementations of the above two methods are described by six embodiments.

Figure 5:
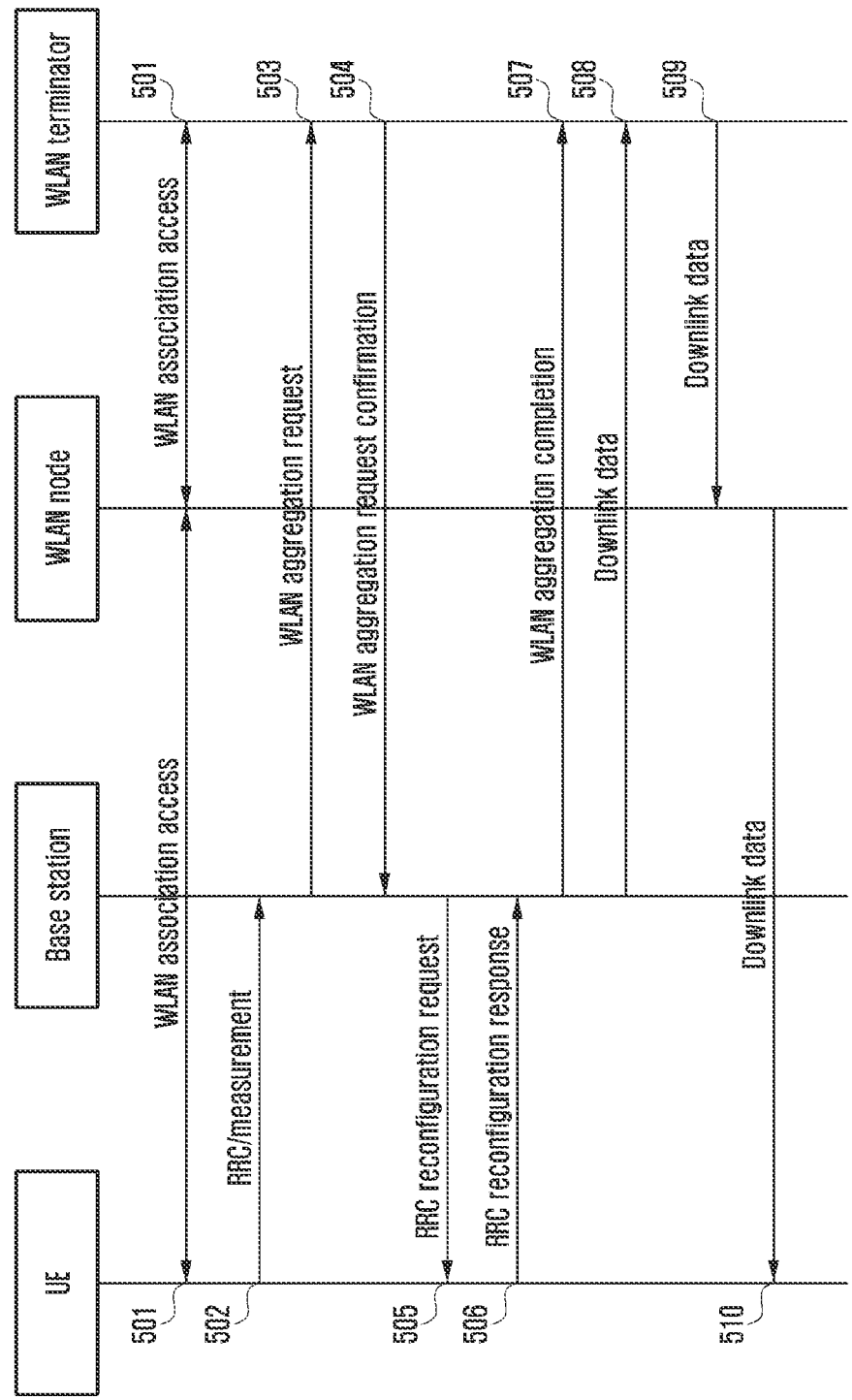
FIG. 5 is a schematic view of a first embodiment of a method for WLAN aggregation control according to the present invention.

FIG. 5 is a schematic view of a first embodiment of a method for WLAN aggregation control according to the present invention. In this embodiment, for ease of description, the description will be given from the sending and processing of data between a plurality of entities. In some implementations, a WLAN node and a WLAN terminator can be integrated. Specifically, this method includes the following steps.

S501: A UE has established association access with a WLAN node in a WT.

S502: The UE sends WLAN information of the UE to a base station. The WLAN information can be sent by a measurement report, an existing RRC message or a new RRC message. The WLAN information of the UE is as described in S301, and will not be repeated here. In some implementations, the base station can acquire, from the WT, WLAN information of a WLAN node in a different PLMN managed by the WT. According to a WLAN ID of a WLAN node reported by the measurement of the UE, the base station can know whether a WLAN node reported by the UE is a WLAN node in a PLMN registered by the UE or an equivalent PLMN, the management range of which WT the WLAN node reported by the UE belongs to, and whether the WLAN node can be re-associated, or more.

S503: The base station determines, according to the received WLAN information of the UE, to establish WLAN aggregation for the UE according to the process in S302. The base station sends a WLAN aggregation request to the WT.

S504: The WT sends a WLAN aggregation request confirmation message to the base station.

S505: The base station sends WLAN aggregation configuration information to the UE. The WLAN aggregation configuration information can be sent by an RRC reconfiguration request message. Optionally, the base station can indicate, in the WLAN aggregation configuration information, the UE to initiate WLAN aggregation at the currently associated WLAN node.

S506: The UE sends an RRC reconfiguration response message to the base station.

S507: Optionally, the base station can send a WLAN aggregation completion message to the WT.

S508: The base station sends downlink data to the WT.

S509: The WT forwards downlink data, sent by the base station, to the WLAN node.

When the WT is a WLAN node or integrated with the WLAN node, the WT may not perform this step. Instead, it can directly perform S510 of sending downlink data to the UE.

S510: The WLAN node sends downlink data to the UE.

Figure 6:
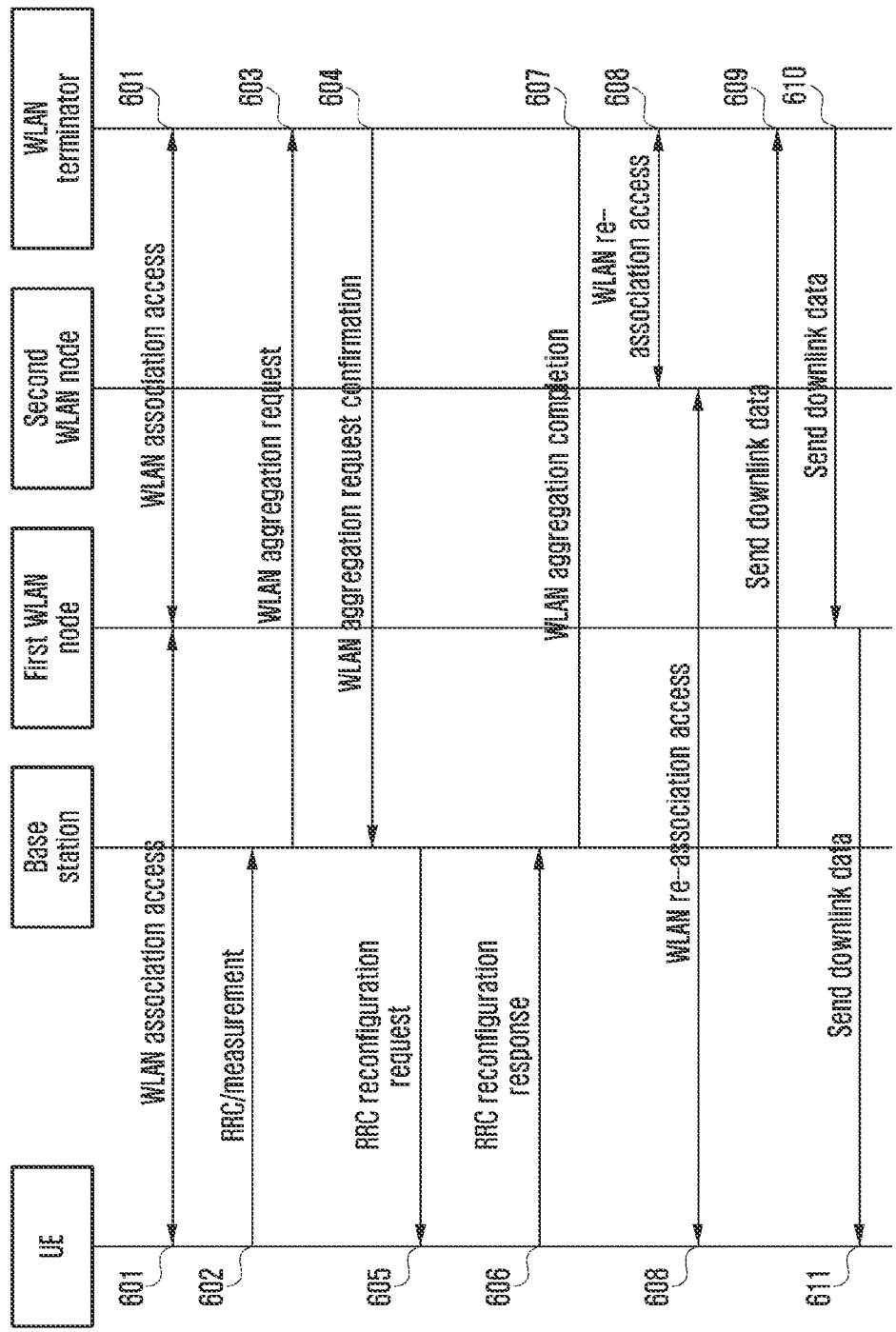
FIG. 6 is a schematic view of a second embodiment of a method for WLAN aggregation control according to the present invention.

FIG. 6 is a schematic view of a second embodiment of a method for WLAN aggregation control according to the present invention. In some implementations, a WLAN node and a WLAN terminator can be integrated. This method includes the following steps.

S601: A UE has established association access with a WLAN node in a WT.

S602: The UE sends WLAN information of the UE to the base station. The WLAN information can be sent by a measurement report, an existing RRC message or a new RRC message. The WLAN information of the UE is as described in S301, and will not be repeated here. In some implementations, the base station can acquire, from the WT, WLAN information of a WLAN node in a different PLMN managed by the WT. According to a WLAN ID of a WLAN node reported by the measurement of the UE, the base station can know whether a WLAN node reported by the UE is a WLAN node in a PLMN registered by the UE or an equivalent PLMN, the management range of which WT the WLAN node reported by the UE belongs to, and whether the WLAN node can be re-associated, or more.

S603: The base station determines, according to the received WLAN information of the UE, to establish WLAN aggregation for the UE according to the process in S302. The base station sends a WLAN aggregation request to the WT.

S604: The WT returns a WLAN aggregation request confirmation message to the base station.

S605: The base station sends WLAN aggregation configuration information to the UE. The WLAN aggregation configuration information can be sent by an RRC reconfiguration request message. Optionally, the base station can indicate, in the WLAN aggregation configuration information, a WLAN node with which the UE is currently associated, or indicate a WLAN aggregation node ID list or a WLAN aggregation threshold condition, so that the UE reselects, from the WLAN aggregation node ID list, one WLAN node whose WLAN information satisfying the WLAN aggregation threshold condition, for association/re-association. The WLAN aggregation threshold condition is as described in S301, and will not be repeated here.

A WLAN node in the WLAN aggregation node ID list being a target WLAN node candidate at least contains one of the following conditions:

a WLAN node in a PLMN registered by the UE or an equivalent PLMN;

a WLAN node within the management range of a home WT of a node with which the UE is currently associated; and a WLAN node with which the UE can be re-associated, from a node with which the UE is currently associated; and S606: The UE sends an RRC reconfiguration response message to the base station.

S607: Optionally, the base station can send a WLAN aggregation completion message to the WT.

S608: The UE is re-associated to access to a second WLAN node in the WT.

S609: The base station sends downlink data to the WT.

S610: The WT forwards downlink data, sent by the base station, to the WLAN node.

When the WT is a WLAN node or integrated with the WLAN node, the WT may not perform this step. Instead, it can directly perform S611 of sending downlink data to the UE.

S611: The WLAN node sends downlink data to the UE.

Figure 7:
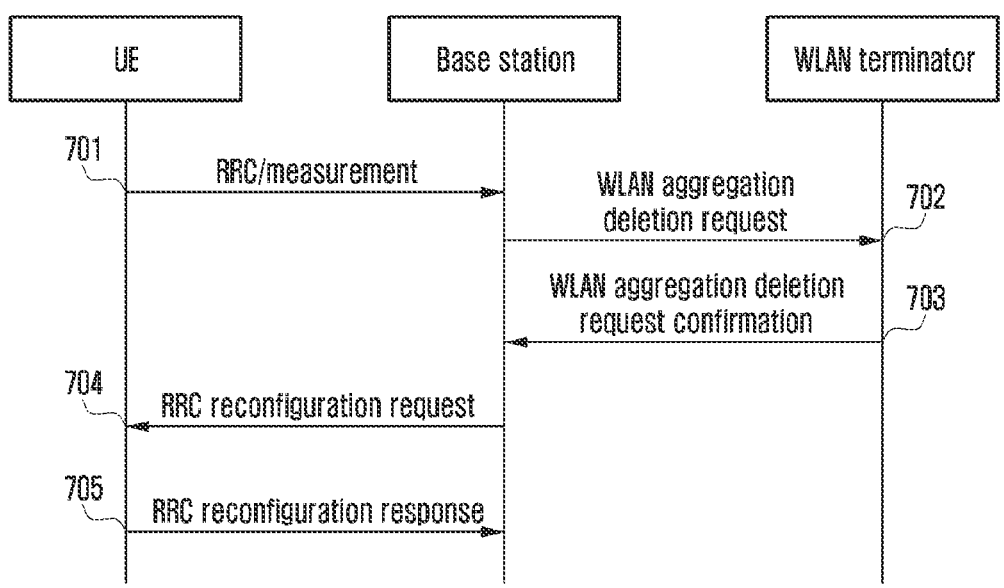
FIG. 7 is a schematic view of a third embodiment of a method for WLAN aggregation control according to the present invention.

FIG. 7 is a schematic view of a third embodiment of a method for WLAN aggregation control according to the present invention. This method includes the following steps.

S701: The UE sends WLAN information of the UE to the base station. The WLAN information can be sent by a measurement report, an existing RRC message or a new RRC message. The WLAN information of the UE is as described in S301, and will not be repeated here. In some implementations, the base station can acquire, from a WT, WLAN information of a WLAN node in a different PLMN managed by the WT. According to a WLAN ID of a WLAN node reported by the measurement of the UE, the base station can know whether a WLAN node reported by the UE is a WLAN node in a PLMN registered by the UE or an equivalent PLMN, the management range of which WT the WLAN node reported by the UE belongs to, and whether the WLAN node can be associated/re-associated, or more.

S702: The base station determines, according to the received WLAN information of the UE, to delete WLAN aggregation of the UE according to the process in S302. The base station sends a WLAN aggregation deletion request to the WT.

S703: The WT returns a WLAN aggregation deletion request confirmation message to the base station.

S704: The base station requests the UE to delete WLAN aggregation. This can be sent by an RRC reconfiguration request message.

S705: The UE sends an RRC reconfiguration response message to the base station.

Figure 8:
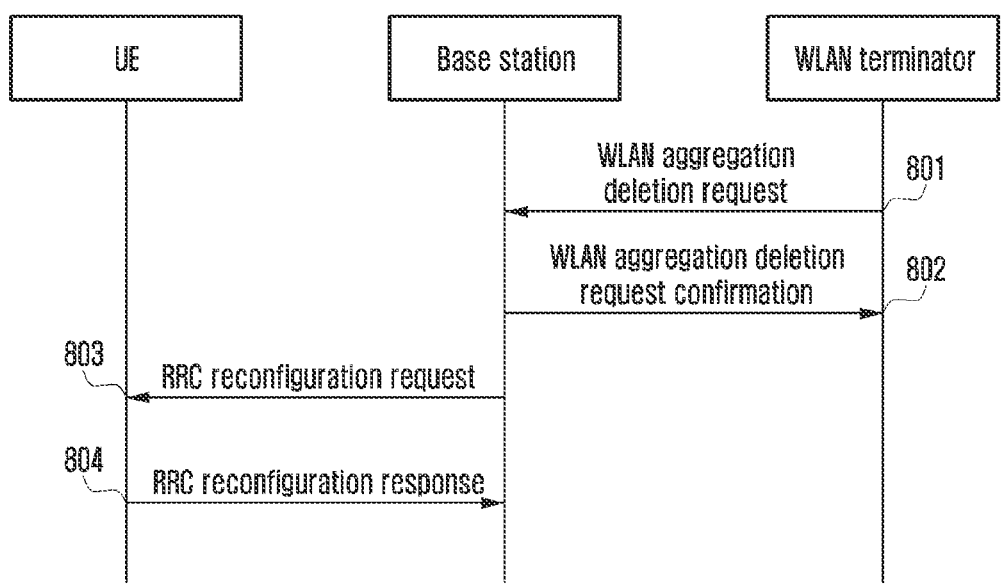
FIG. 8 is a schematic view of a fourth embodiment of a method for WLAN aggregation control according to the present invention.

FIG. 8 is a schematic view of a fourth embodiment of a method for WLAN aggregation control according to the present invention. This method includes the following steps.

S801: A base station receives a WLAN aggregation deletion request sent by a WT.

The deletion reason is indicated as de-association of the UE.

S802: The base station returns a WLAN aggregation deletion request confirmation to the WT.

S803: The base station requests the UE to delete WLAN aggregation. This can be sent by an RRC reconfiguration request message.

S804: The UE sends an RRC reconfiguration response message to the base station.

Figure 9:
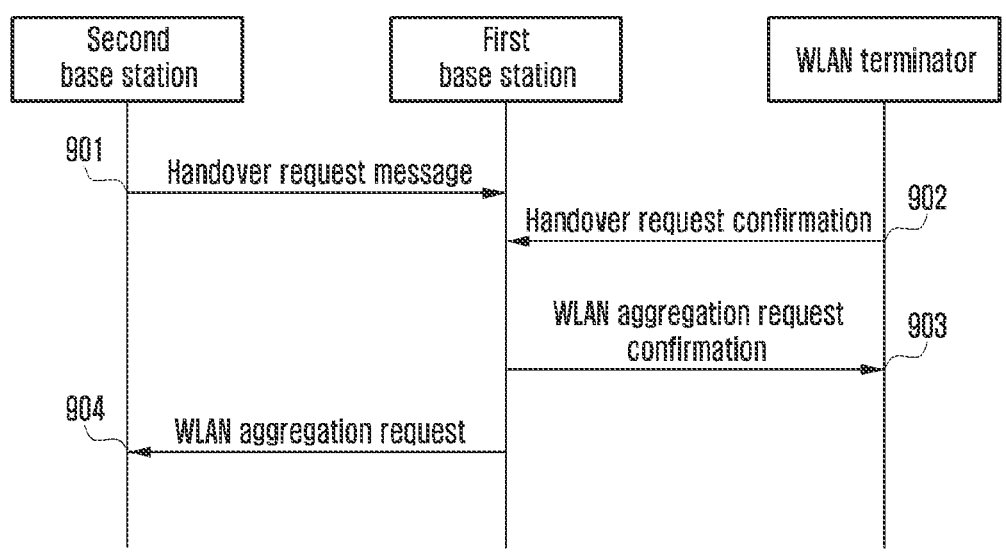
FIG. 9 is a schematic view of a fifth embodiment of a method for WLAN aggregation control according to the present invention.

FIG. 9 is a schematic view of a fifth embodiment of a method for WLAN aggregation control according to the present invention. In this embodiment, a UE is switched between a first base station and a second base station, the first base station is a target base station of handover, and the second base station is a source base station of handover. This method includes the following steps.

S901: The first base station receives a handover request message sent by the second base station. Optionally, the message contains WLAN information of the UE. The WLAN information of the UE is as described in S301, and will not be repeated here.

S902: The first base station determines, according to the received WLAN information of the UE, to establish WLAN aggregation for the UE according to the process in S302. The first base station sends a WLAN aggregation request to the WT.

S903: The WT returns a WLAN aggregation request confirmation to the first base station. Optionally, it contains WLAN aggregation preparation information.

S904: The first base station returns a handover request confirmation message to the second base station. Optionally, this message contains WLAN aggregation preparation information. The second base station can configure the UE according to the received WLAN preparation information.

Figure 10:
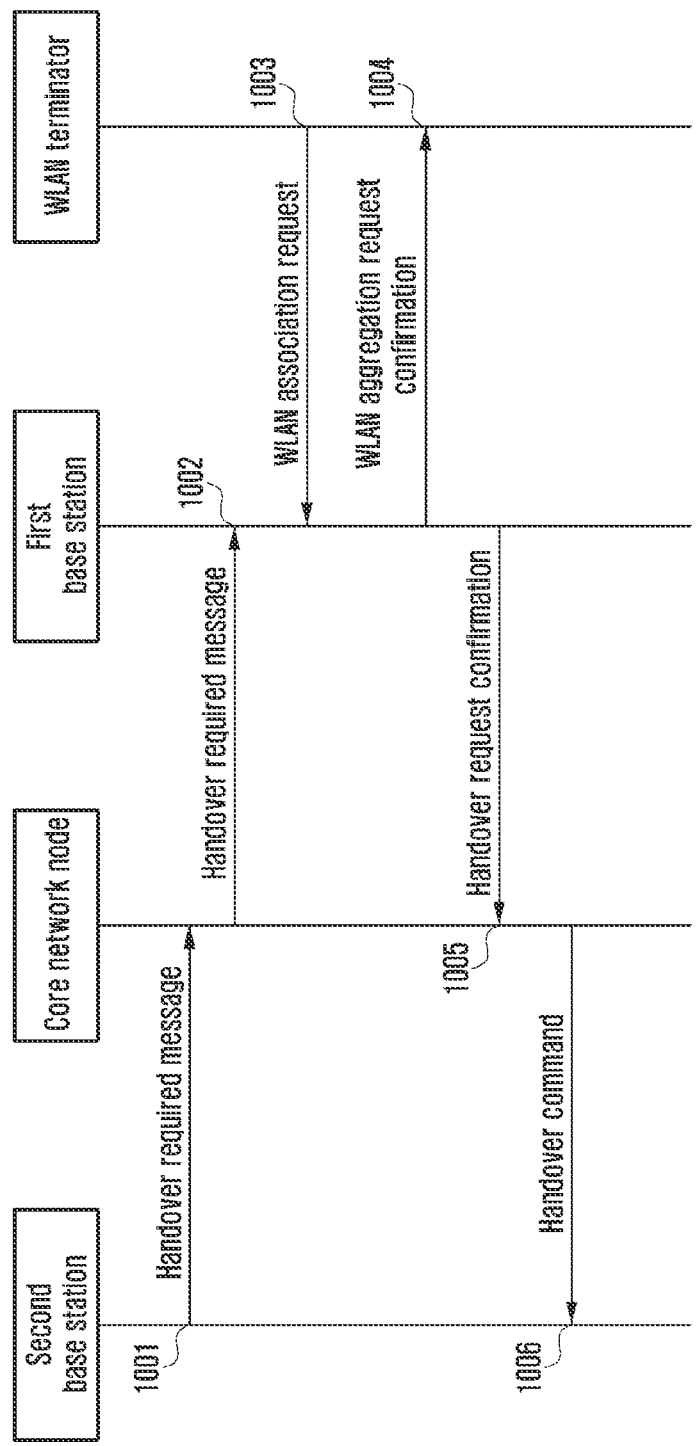
FIG. 10 is a schematic view of a sixth embodiment of a method for WLAN aggregation control according to the present invention.

FIG. 10 is a schematic view of a sixth embodiment of a method for WLAN aggregation control according to the present invention. Similar to the fifth embodiment, in this embodiment, a UE is switched between a first base station and a second base station, the first base station is a target base station of handover, and the second base station is a source base station of handover. This method includes the following steps.

S1001: The second base station sends a handover required message to a core network node. Optionally, this message contains WLAN information of the UE. The WLAN information of the UE is as described in S301, and will not be repeated here.

S1002: The core network node sends a handover request message to the first base station. Optionally, this message contains WLAN information of the UE. The WLAN information of the UE is as described in S301, and will not be repeated here.

S1003: The first base station determines, according to the received WLAN information of the UE, to establish WLAN aggregation for the UE according to the process in S302. The first base station sends a WLAN aggregation request to the WT.

S1004: The WT returns a WLAN aggregation request confirmation to the first base station. Optionally, it contains WLAN aggregation preparation information. Optionally, the WLAN aggregation preparation information at least includes one of the following: a node ID list for WLAN aggregation, an IP address reserved for the UE, a PLMN ID and an ID of the UE.

S1005: The first base station returns a handover request confirmation to the second base station. Optionally, it contains WLAN aggregation preparation information. The WLAN aggregation preparation information is as described in S1004.

S1006: The core network node returns a handover command to the second base station. Optionally, this command contains WLAN aggregation preparation information. The WLAN aggregation preparation information is as described in S1004. The second base station can configure the UE according to the received WLAN preparation information.

Figure 11:
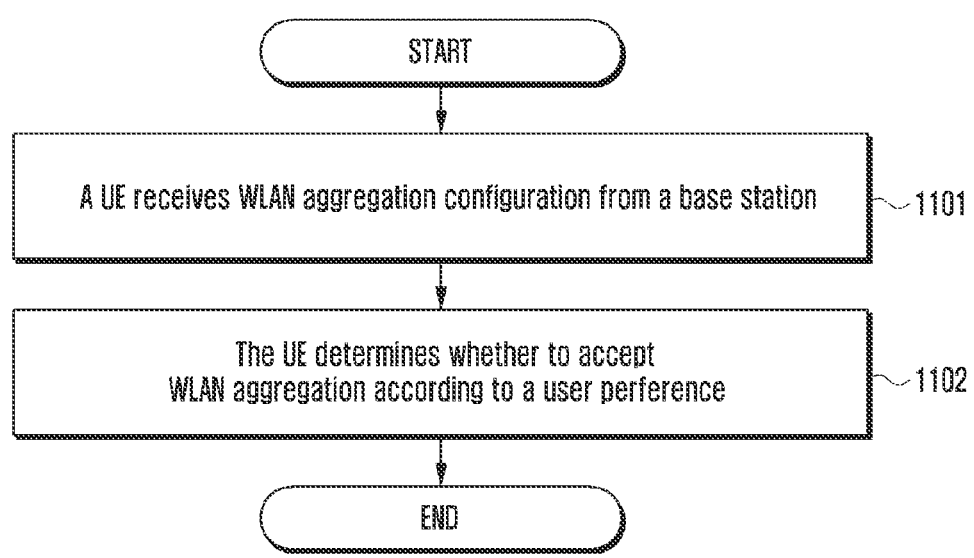
FIG. 11 is a schematic flowchart of a third method for WLAN aggregation control according to the present invention.

FIG. 11 is a schematic flowchart of a third method for WLAN aggregation control according to the present invention. This method includes the following steps.

S1101: A UE receives WLAN aggregation configuration from a base station.

The WLAN aggregation configuration is used for indicating requirements to be satisfied by a node for WLAN aggregation. Optionally, the WLAN aggregation configuration information at least contains one of the following: a PLMN ID, a WLAN aggregation node ID list, a WLAN aggregation threshold condition, association/re-association decision time, and indication of that the currently associated WLAN node is preferably used.

S1102: The UE determines whether WLAN aggregation is to be to established satisfying the WLAN aggregation configuration according to the user preference.

Optionally, assumed that a user has associated one WLAN node via the UE before establishing WLAN aggregation, if the WLAN node to which the UE has been associated satisfies one of the following conditions for establishing WLAN aggregation on the UE side, the UE can preferentially select this associated WLAN node to establish WLAN aggregation.

a WLAN aggregation node ID list contains a WLAN ID of a WLAN node with which the UE is currently associated;

WLAN information of a WLAN node with which the UE is currently associated satisfies the WLAN aggregation threshold condition; and whether WLAN information satisfies the WLAN aggregation threshold condition is as described in Step 301, and will not be repeated here;

a WLAN node with which the UE is currently associated does not satisfy the WLAN aggregation threshold condition, but the UE measures that there is another WLAN node which at least satisfies one of the following conditions:

the WLAN aggregation node ID list contains a node ID of this WLAN node; and a WLAN node satisfying the WLAN aggregation threshold condition.

In some implementations, if this associated WLAN node on longer satisfies the conditions for establishing WLAN aggregation on the UE side, the UE may not establish WLAN aggregation for the UE.

In some implementations, the UE determines, according to indication sent by the base station that the currently associated WLAN node is preferentially used, whether to preferentially use the associated WLAN node to establish WLAN aggregation.

Optionally, when the user has turned off the WLAN function of the UE before establishing WLAN aggregation, the UE may not establish WLAN aggregation for the UE, and instead, returns to the base station information indicating that the establishment of WLAN aggregation is refused. The refuse reason can be that the WLAN node with which the UE is currently associated does not support WLAN aggregation configured by the base station.

Figure 12:
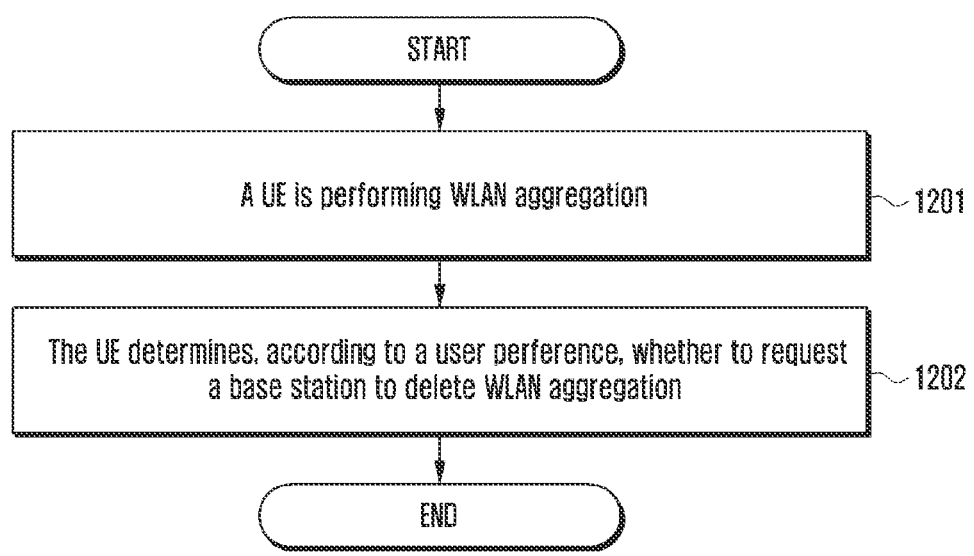
FIG. 12 is a schematic flowchart of a fourth method for WLAN aggregation control according to the present invention.

FIG. 12 is a schematic flowchart of a fourth method for WLAN aggregation control according to the present invention. This method includes the following steps:

S1201: A UE is performing WLAN aggregation, and is receiving user selection.

The user selection can be that a new WLAN node is reselected, or a WLAN node for WLAN aggregation is de-associated, or the WLAN function of the UE is turned off, or more.

S1202: The UE determines, according to the user preference, whether to request a base station to delete WLAN aggregation.

In some implementations, when the UE is performing WLAN aggregation, if a user reselects to access to a new WLAN node via the UE in S1201 and when this WLAN node at least satisfies one of the following WLAN de-aggregation conditions on the UE side, the UE can request the base station to delete the current WLAN aggregation of the UE:

a WLAN aggregation node ID list does not contain a WLAN ID of a WLAN node to which the UE is reselected to access;

not a WLAN node in a PLMN currently registered by the UE and/or an equivalent PLMN;

not a WLAN node allowed to be associated/re-associated for the current UE's WLAN aggregation; and WLAN information of a WLAN node with which the UE re-accesses does not satisfy the WLAN aggregation threshold condition. The WLAN aggregation threshold condition is as described in S301, and will not be repeated here.

In some implementations, when the UE is performing WLAN aggregation, if a user selects, in S1201, to de-associate the WLAN node for WLAN aggregation or turn off the WLAN function of the UE, the UE can request the first base station to delete the current WLAN aggregation of the UE.

Figure 13:
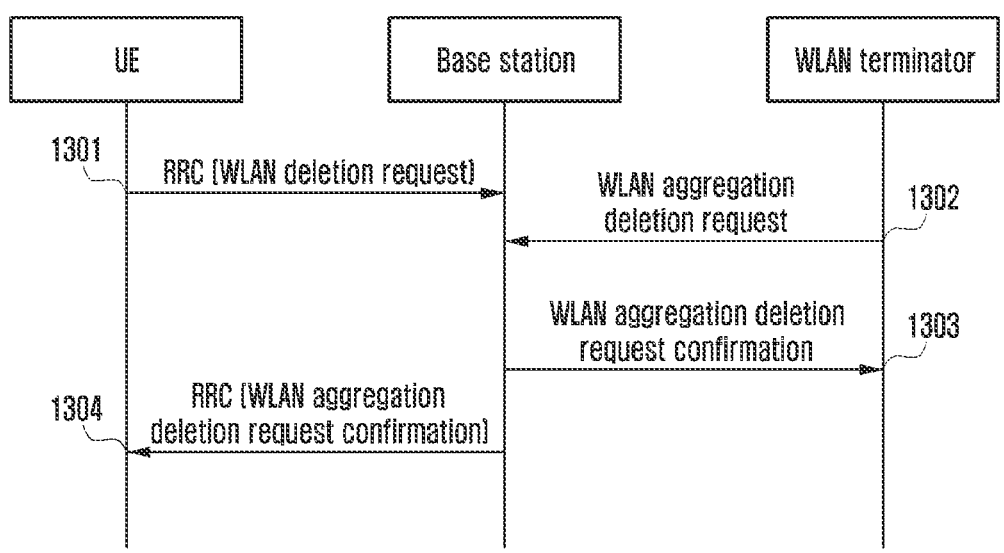
FIG. 13 is a schematic view of a seventh embodiment of a method for WLAN aggregation control according to the present invention.

The specific implementations of the fourth method will be described by a seventh embodiment. FIG. 13 is a schematic view of the seventh embodiment of a method for WLAN aggregation control according to the present invention. This method includes the following steps.

S1301: A UE is performing WLAN aggregation, when a user reselects one WLAN node via the UE, de-associates with the WLAN node for WLAN aggregation, or turns off the WLAN function of the UE and the above situation satisfies conditions in 1202, the UE sends a WLAN aggregation deletion request to a base station.

S1302: The base station sends a WLAN aggregation deletion request to a WT for WLAN aggregation.

S1302: The WT returns a WLAN aggregation deletion request confirmation to the base station.

S1302: The base station sends a WLAN aggregation deletion request confirmation to the UE.

The above description is the specific implementation of a method for WLAN aggregation control in the present application. The present application further provides a base station device and a user equipment for WLAN aggregation control, which can be used for implementing such a method. Specifically, according to the first method, the present application provides a base station device for WLAN aggregation control, including a receiving unit and a control unit; the receiving unit is configured to receive WLAN information of a user equipment (UE), the WLAN information of the UE includes one or more of the following: user preference information, WLAN information of a WLAN node with which the UE is being associated, WLAN information of a WLAN node reselected by the UE, de-association information of the UE with a WLAN node, WLAN enabling information of the UE, and WLAN disabling information of the UE; and the control unit is configured to determine whether WLAN aggregation is to be established, modified or deleted for the UE according to the received WLAN information of the UE.

Corresponding to the second method for WLAN aggregation control of the present application, the present application provides a base station device for WLAN aggregation control, including: a receiving unit and a control unit; the receiving unit is configured to receive information indicating to delete WLAN aggregation or receives de-association information of the UE with a WLAN node from a WT; and the control unit is configured to delete, according to the information indicating to delete WLAN aggregation or de-associate the UE with a WLAN node, WLAN aggregation specified by said information.

Corresponding to the third method for WLAN aggregation control of the present application, the present application provides a user equipment for WLAN aggregation control, including: a receiving unit and a control unit; the receiving unit is configured to receive WLAN aggregation configuration sent by a base station for indicating requirements to be satisfied by a WLAN aggregation node, the WLAN aggregation configuration including one or more of the following: a PLMN ID, a WLAN aggregation node ID list, a WLAN aggregation threshold condition, and association/re-association decision time; and the control unit is configured to determine whether WLAN aggregation is to be to established satisfying the WLAN aggregation configuration according to user selection.

Corresponding to the fourth method for WLAN aggregation control of the present application, the present application provides a user equipment for WLAN aggregation control, including: a receiving unit and a control unit; the receiving unit is configured to receive user selection; and the control unit is configured to determine, according to the user selection, whether to request a base station to delete an established WLAN aggregation.

It can be seen from the above technical solutions that, the base station can reasonably control the establishment and deletion of WLAN aggregation by acquiring the user behavior in the UE and the WLAN information of the UE. On one hand, the selection of users is respected maximally, and on the other hand, the bandwidth of the WLAN is maximally utilized to serve the UE and increase the throughput rate of the UE.

The foregoing descriptions are merely preferred embodiments of the present invention and not intended to limit the present invention. All modifications, equivalent replacements, improvements or the like made without departing from the spirit and principle of the present invention shall be regarded as falling into the protection scope of the present invention.

The invention claimed is:

1. A method performed by a terminal in a wireless communication system, the method comprising:
   receiving, from a base station, configuration information including a list of wireless local area network (WLAN) identities (IDs);
   identifying a status of a WLAN connection to a WLAN corresponding to at least one of the WLAN IDs for wireless access network (WAN)-WLAN aggregation;
   setting status information on the status of the WLAN connection; and
   transmitting, to the base station, the status information,
   wherein, in response to a failure of the WLAN connection according to a connection to another WLAN based on user preference, the status information indicates the failure of the WLAN connection and a cause of failure of the connection that is set to information corresponding to the connection to another WLAN based on the user preference, the user preference being determined by a user via the terminal,
   wherein, in response to a success of the WLAN connection, the status information indicates a successful association with the WLAN,
   wherein the WLAN ID includes at least one of a basic service set identifier (BSSID) or a homogenous extended service set identifier (HESSID), and
   wherein the status information further includes identification parameters of the WLAN to which the terminal is connected.

2. The method of claim 1, wherein the WAN includes long term evolution (LTE).

3. A method performed by a base station in a wireless communication system, the method comprising:
   transmitting, to a terminal, configuration information including a list of wireless local area network (WLAN) identities (IDs);
   receiving, from the terminal, status information on a status of a connection to a WLAN corresponding to at least one of the WLAN IDs for wireless access network (WAN)-WLAN aggregation;
   identifying the status of the WLAN connection based on the status information; and
   determining whether to transmit a signal via the WLAN connection based on the identification result,
   wherein, in response to a failure of the WLAN connection according to a connection to another WLAN based on user preference, the status information indicates the failure of the WLAN connection and a cause of failure of the connection that is set to information corresponding to the connection to another WLAN based on the user preference, the user preference being determined by a user via the terminal,
   wherein, in response to a success of the WLAN connection, the status information indicates a successful association with the WLAN,
   wherein the WLAN ID includes at least one of a basic service set identifier (BSSID) or a homogenous extended service set identifier (HESSID), and
   wherein the status information further includes identification parameters of the WLAN to which the terminal is connected.

4. The method of claim 3, wherein the WAN includes long term evolution (LTE).

5. A terminal in a wireless communication system, the terminal comprising:
   a transceiver; and
   a controller coupled with the transceiver and configured to:
   receive, from a base station, configuration information including a list of wireless local area network (WLAN) identities (IDs),
   identify a status of a WLAN connection to a WLAN corresponding to at least one of the WLAN IDs for wireless access network (WAN)-WLAN aggregation,
   set status information on the status of the WLAN connection; and
   transmit, to the base station, the status information,
   wherein, in response to the status of failure of the WLAN connection according to a connection to another WLAN based on user preference, the status information indicates the failure of the WLAN connection and a cause of failure of the connection that is set to information corresponding to the connection to another WLAN based on the user preference, the user preference being determined by a user via the terminal, wherein, in response to a success of the WLAN connection, the status information indicates a successful association with the WLAN, wherein the WLAN ID includes at least one of a basic service set identifier (BSSID) or a homogenous extended service set identifier (HESSID), and wherein the status information further includes identification parameters of the WLAN to which the terminal is connected.

6. The terminal of claim 5, wherein the WAN includes long term evolution (LTE).

7. A base station in a wireless communication system, the base station comprising:

a transceiver; and a controller coupled with the transceiver and configured to:

transmit, to a terminal, configuration information including a list of wireless local area network (WLAN) identities (IDs), receive, from the terminal, a report message including status information on a status of a connection to a WLAN corresponding to at least one of the WLAN IDs for wireless access network (WAN)-WLAN aggregation, identify the status of the WLAN connection based on the status information, and determine whether to transmit a signal via the WLAN connection based on the identification result, wherein, in response to a failure of the WLAN connection according to a connection to another WLAN based on user preference, the status information indicates the failure of the WLAN connection and a cause of failure of the connection that is set to information corresponding to the connection to another WLAN based on the user preference, the user preference being determined by a user via the terminal, wherein, in response to a success of the WLAN connection, the status information indicates a successful association with the WLAN, wherein the WLAN ID includes at least one of a basic service set identifier (BSSID) or a homogenous extended service set identifier (HESSID), and wherein the status information further includes identification parameters of the WLAN to which the terminal is connected.

8. The base station of claim 7, wherein the WAN includes long term evolution (LTE).

* * * * *